United States Patent
Wada

(10) Patent No.: US 9,134,569 B2
(45) Date of Patent: Sep. 15, 2015

(54) LIQUID CRYSTAL LENS MANUFACTURING METHOD AND LIQUID CRYSTAL LENS

(75) Inventor: Masanori Wada, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 217 days.

(21) Appl. No.: 13/822,301

(22) PCT Filed: Jan. 26, 2012

(86) PCT No.: PCT/JP2012/051589
§ 371 (c)(1),
(2), (4) Date: Mar. 12, 2013

(87) PCT Pub. No.: WO2012/102318
PCT Pub. Date: Aug. 2, 2012

(65) Prior Publication Data
US 2013/0169920 A1    Jul. 4, 2013

(30) Foreign Application Priority Data
Jan. 27, 2011    (JP) .................... 2011-015204

(51) Int. Cl.
*G02F 1/1347*    (2006.01)
*G02F 1/1333*    (2006.01)
(Continued)

(52) U.S. Cl.
CPC ........ *G02F 1/133526* (2013.01); *C03B 23/037* (2013.01); *G02B 3/14* (2013.01);
(Continued)

(58) Field of Classification Search
CPC ... G02F 1/133351; G02F 1/29; G02F 1/1347; G02F 2001/294; G02B 1/041; G02B 6/3538; G02B 26/004; G02B 3/14
USPC .............................. 349/74, 158, 200
See application file for complete search history.

(56) References Cited

U.S. PATENT DOCUMENTS 5,492,582 A * 2/1996 Ide et al. .................. 156/106
6,700,639 B2 * 3/2004 Tatemura et al. ......... 349/200
(Continued)

FOREIGN PATENT DOCUMENTS

| CN | 1873488 A | 12/2006 |
|---|---|---|
| CN | 101211032 A | 7/2008 |

(Continued)

OTHER PUBLICATIONS

English translation of Official Communication issued in corresponding International Application PCT/JP2012/051589, mailed on Aug. 8, 2013.

(Continued)

*Primary Examiner* — Paisley L Arendt
(74) *Attorney, Agent, or Firm* — Keating & Bennett, LLP

(57) ABSTRACT

Provided are a method for manufacturing a liquid crystal lens which, even with the use of a thin sheet glass as a glass sheet for dividing a liquid crystal layer, can reduce the likelihood of breakage of the thin sheet glass in the production process and the liquid crystal lens. A mother liquid crystal lens having a plurality of liquid crystal lens units arrayed in a longitudinal direction thereof is cut for each of the liquid crystal lens units to separate out the liquid crystal lens units and thus manufacture respective liquid crystal lenses 10. Longitudinally extending side surfaces 13c, 13d, 14c, and 14d of glass ribbons which provide thin sheet glasses 13 and 14 have an outwardly bulging curved shape in a cross section perpendicular to the longitudinal direction.

8 Claims, 6 Drawing Sheets

(51) Int. Cl.
  *G02F 1/13* (2006.01)
  *G02F 1/1335* (2006.01)
  *G02B 3/14* (2006.01)
  *C03B 23/037* (2006.01)
  *G02F 1/29* (2006.01)
  *G02B 6/35* (2006.01)
  *G02B 26/00* (2006.01)
  *G02B 1/04* (2006.01)
  *G02F 1/1341* (2006.01)

(52) U.S. Cl.
  CPC ............ *G02F 1/1333* (2013.01); *G02B 1/041* (2013.01); *G02B 6/3538* (2013.01); *G02B 26/004* (2013.01); *G02F 1/1313* (2013.01); *G02F 1/1341* (2013.01); *G02F 1/13471* (2013.01); *G02F 1/29* (2013.01); *G02F 2001/133302* (2013.01); *G02F 2001/294* (2013.01)

(56) References Cited

U.S. PATENT DOCUMENTS 7,599,128 B2 * 10/2009 Shimozono et al. .......... 359/742
2005/0211699 A1 * 9/2005 Faris et al. .................... 219/522
2006/0268216 A1   11/2006 Song
2007/0139333 A1    6/2007 Sato et al.
2008/0202167 A1 *  8/2008 Cavallaro et al. ............ 65/104
2010/0060823 A1    3/2010 Ju et al.

FOREIGN PATENT DOCUMENTS

| | | |
|---|---|---|
| EP | 1 783 538 A1 | 5/2007 |
| EP | 2 161 616 A2 | 3/2010 |
| JP | 2004-004616 A | 1/2004 |
| JP | 2006-091826 A | 4/2006 |
| JP | 2010-066768 A | 3/2010 |
| JP | 2010-107686 A | 5/2010 |
| JP | 2011-175104 A | 9/2011 |
| WO | 2006/022346 A1 | 3/2006 |

OTHER PUBLICATIONS

Official Communication issued in International Patent Application No. PCT/JP2012/051589, mailed on Apr. 3, 2012.

* cited by examiner (a)

(b)

LIQUID CRYSTAL LENS MANUFACTURING METHOD AND LIQUID CRYSTAL LENS

TECHNICAL FIELD

This invention relates to a method for manufacturing a liquid crystal lens which can be variably controlled in optical property by changing a state of alignment of liquid crystal molecules in a liquid crystal layer by application of an external electric field to the liquid crystal layer and also relates to the liquid crystal lens.

BACKGROUND ART

Liquid crystal devices can be easily controlled in state of alignment of liquid crystal molecules, thus can be variably controlled in optical property, and are therefore being considered to be used as liquid crystal lenses.

In order to increase a lens power, such as the variable range of focal distances, in such a liquid crystal lens, the liquid crystal layer needs to be increased in thickness. However, if the liquid crystal layer is increased in thickness, there arises a problem of reduced speed of response of the optical property of the liquid crystal lens to the voltage applied thereto.

Patent Literatures 1 and 2 propose a method in which a liquid crystal layer is divided into two sublayers by the intervention of a thin glass sheet therebetween to reduce the effective thickness of the liquid crystal layer to half.

Patent Literature 3 describes that, with the use of a thin glass sheet having a thickness of about 100 μm or less, for example, 70 μm, as in the method described in Patent Literatures 1 and 2, such a thin glass sheet is very likely to be broken to make the production process of the liquid crystal lens difficult. However, a method described in Patent Literature 3 has still not solved the problem that with the use of a thin glass sheet the thin glass sheet is likely to be broken in the production process.

CITATION LIST

Patent Literature

Patent Literature 1: JP-A-2004-4616
Patent Literature 2: JP-A-2006-91826
Patent Literature 3: JP-A-2010-107686

SUMMARY OF INVENTION

Technical Problem

An object of the present invention is to provide a method for manufacturing a liquid crystal lens which, even with the use of a thin sheet glass as a glass sheet for dividing a liquid crystal layer, can reduce the likelihood of breakage of the thin sheet glass in the production process and provide the liquid crystal lens.

Solution to Problem

A manufacturing method of the present invention is a method for manufacturing a liquid crystal lens capable of changing a state of alignment of liquid crystal molecules in a liquid crystal layer sandwiched between a pair of transparent substrates by application of an electric field to the liquid crystal layer, the liquid crystal layer being divided into a plurality of cells by a thin sheet glass disposed substantially in parallel with the transparent substrates, in which a mother liquid crystal lens having a plurality of liquid crystal lens units arrayed in a longitudinal direction thereof is cut for each of the liquid crystal lens units to separate out the liquid crystal lens units and thus manufacture respective liquid crystal lenses. The method has the following feature.

Specifically, the manufacturing method of the present invention includes the steps of: preparing a pair of mother transparent substrates which provide the transparent substrates of the liquid crystal lenses after being cut; forming electrode layers for application of the electric field on regions of the mother transparent substrates corresponding to the liquid crystal lens units and forming alignment films for aligning the liquid crystal molecules on regions of the mother transparent substrates neighboring the liquid crystal layer; preparing a glass ribbon which provides the thin sheet glasses of the liquid crystal lenses after being cut and has a pair of opposed principal surfaces and a pair of opposed side surfaces all of which extend along the longitudinal direction; forming alignment films for aligning the liquid crystal molecules on regions of the principal surfaces of the glass ribbon neighboring the liquid crystal layer; forming sealing portions for formation of walls of the cells of the liquid crystal layer around regions of the mother transparent substrates corresponding the liquid crystal layer and/or around regions of the principal surfaces of the glass ribbon corresponding to the liquid crystal layer; producing the mother liquid crystal lens by bonding the pair of mother transparent substrates and the pair of principal surfaces of the glass ribbon together to bring a state in which the glass ribbon is disposed between the pair of mother transparent substrates, then filling the cells of the liquid crystal layer with liquid crystals, and then sealing the cells of the liquid crystal layer; and cutting the mother liquid crystal lens for each of the liquid crystal lens units to separate out the liquid crystal lens units and thus manufacture the respective liquid crystal lenses, wherein the side surfaces of the glass ribbon extending along the longitudinal direction have an outwardly bulging curved shape in a cross section perpendicular to the longitudinal direction.

In the present invention, a glass ribbon whose side surfaces extending along the longitudinal direction have an outwardly bulging curved shape in a cross section perpendicular to the longitudinal direction is used in producing the mother liquid crystal lens. Since a glass ribbon whose side surfaces have an outwardly bulging curved shape is used as the glass ribbon providing the thin sheet glasses of the liquid crystal lens units, this can reduce the likelihood of breakage of the glass ribbon, i.e., the thin sheet glasses, in the production process during production of the mother liquid crystal lens. Therefore, in the manufacturing method of the present invention, even with the use of a thin sheet glass as a glass sheet for dividing a liquid crystal layer, the likelihood of breakage of the thin sheet glass in the production process can be reduced.

In the present invention, the glass ribbon preferably has a thickness of 100 μm or less. Therefore, the thickness of the thin sheet glass used in the liquid crystal lens is preferably 100 μm or less.

The shape of the cross section of the side surfaces of the glass ribbon in the present invention is preferably a shape formed by softening of glass.

In the present invention, the aspect ratio of the length of the principal surfaces of the glass ribbon taken perpendicularly to the longitudinal direction thereof to the thickness of the glass ribbon (principal surface length to thickness) is preferably within the range of 25 to 2000.

Therefore, the aspect ratio of the length of the principal surfaces of the thin sheet glass taken perpendicularly to the longitudinal direction thereof to the thickness of the thin sheet glass (principal surface length to thickness) is also preferably within the range of 25 to 2000.

In the present invention, the glass ribbon is preferably made of crystallized glass.

A liquid crystal lens of the present invention is a liquid crystal lens capable of changing a state of alignment of liquid crystal molecules in a liquid crystal layer sandwiched between a pair of transparent substrates by application of an electric field to the liquid crystal layer, wherein the liquid crystal layer is divided into a plurality of cells by a thin sheet glass disposed substantially in parallel with the transparent substrates, the thin sheet glass is a glass sheet obtained by cutting a glass ribbon in a direction substantially perpendicular to a longitudinal direction thereof, and side surfaces of the thin sheet glass other than the cut surfaces have an outwardly bulging curved shape.

In the liquid crystal lens of the present invention, the thin sheet glass for dividing the liquid crystal layer into a plurality of cells is a glass sheet obtained by cutting a glass ribbon in a direction substantially perpendicular to a longitudinal direction thereof, and side surfaces of the thin sheet glass other than the cut surfaces have an outwardly bulging curved shape. Therefore, the liquid crystal lens is a liquid crystal lens that can be manufactured by the manufacturing method of the present invention, and the liquid crystal lens can reduce the likelihood of breakage of the thin sheet glass in the production process and can be manufactured with a good production efficiency.

Advantageous Effects of Invention

In the present invention, even with the use of a thin sheet glass as a glass sheet for dividing a liquid crystal layer, the likelihood of breakage of the thin sheet glass in the production process can be reduced. Therefore, in the present invention, a thin sheet glass having a smaller thickness than ever before can be used as the thin sheet glass. Hence, a liquid crystal lens can be manufactured which has an increased lens power and concurrently has a high response speed.

In addition, since the breakage of the thin sheet glass in the production process can be reduced, a liquid crystal lens having a high lens power and a high response speed can be manufactured at a high yield.

Since a thin sheet glass having a small thickness can be used for the liquid crystal lens of the present invention, the liquid crystal lens can provide a high response speed while increasing the lens power. In addition, since the breakage of the thin sheet glass in the production process can be reduced, a liquid crystal lens having a high productivity can be provided.

DESCRIPTION OF EMBODIMENTS

Hereinafter, the present invention will be described with reference to specific embodiments but is not at all limited to the following embodiments.

Figure 1:
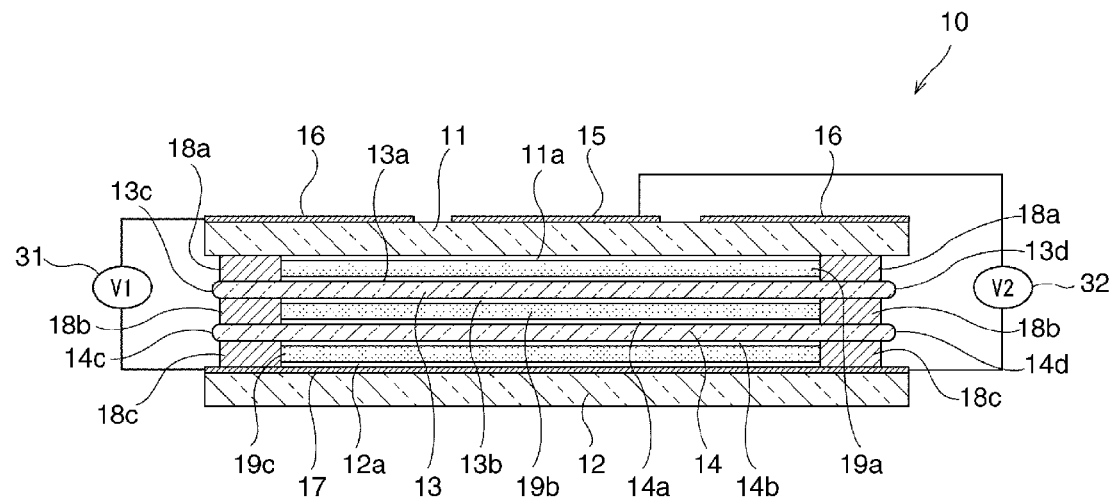
FIG. 1 is a cross-sectional view showing a liquid crystal lens of a first embodiment according to the present invention.

FIG. 1 is a cross-sectional view showing a liquid crystal lens of a first embodiment according to the present invention.

As shown in FIG. 1, a liquid crystal lens 10 is formed by disposing a first thin sheet glass 13 and a second thin sheet glass 14 between and substantially in parallel with a pair of transparent substrates 11 and 12. A liquid crystal layer 19a is provided between the first transparent substrate 11 and the first thin sheet glass 13. A liquid crystal layer 19b is provided between the first thin sheet glass 13 and the second thin sheet glass 14. A liquid crystal layer 19c is provided between the second thin sheet glass 14 and the second transparent substrate 12. Thus, by providing the first thin sheet glass 13 and the second thin sheet glass 14 between the first transparent substrate 11 and the second transparent substrate 12, a liquid crystal layer is divided into three individual cells for the liquid crystal layers 19a, 19b, and 19c.

The cell containing the liquid crystal layer 19a is formed by providing a sealing portion 18a between the first transparent substrate 11 and the first thin sheet glass 13. The cell containing the liquid crystal layer 19b is formed by providing a sealing portion 18b between the first thin sheet glass 13 and the second thin sheet glass 14. The cell containing the liquid crystal layer 19c is formed by providing a sealing portion 18c between the second thin sheet glass 14 and the second transparent substrate 12.

The surface of the first transparent substrate 11 opposite to the surface thereof provided with the liquid crystal layer 19a is provided with a circular electrode 15 and a peripheral electrode 16 placed around the circular electrode 15.

Figure 2:
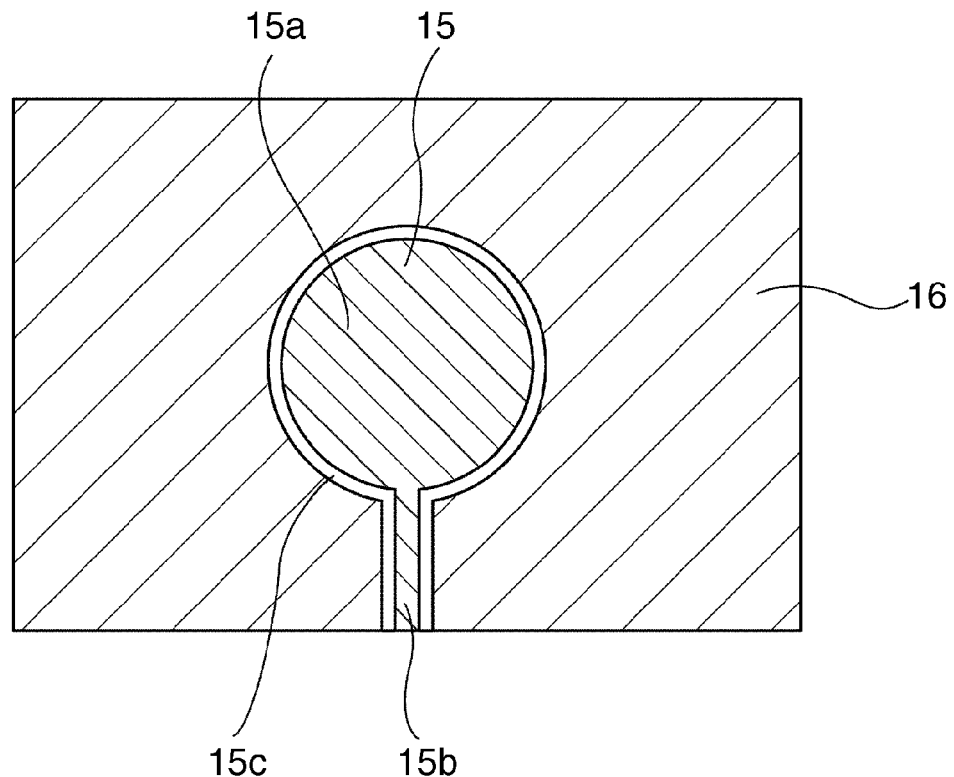
FIG. 2 is a plan view showing the planar shapes of a circular electrode and a peripheral electrode in the first embodiment according to the present invention.

FIG. 2 is a plan view showing the planar shapes of the circular electrode 15 and the peripheral electrode 16. As shown in FIG. 2, the circular electrode 15 is composed of a circular portion 15a formed in the center and a lead-out portion 15b extending from the circular portion 15a to an end surface. The peripheral electrode 16 is provided around the circular electrode 15 with a clearance 15c therebetween.

Referring back to FIG. 1, a counter electrode 17 is provided on top of the second transparent substrate 12 to face toward the circular electrode 15 and the peripheral electrode 16.

An alignment film 11a for aligning liquid crystal molecules in the liquid crystal layer 19a is provided on the surface of the first transparent substrate 11 provided with the liquid crystal layer 19a. An alignment film 13a is provided on the surface of the first thin sheet glass 13 facing the alignment film 11a. The liquid crystal layer 19a is disposed between the alignment film 11a and the alignment film 13a.

An alignment film 13b for aligning liquid crystal molecules in the liquid crystal layer 19b is provided on the surface of the first thin sheet glass 13 neighboring the liquid crystal layer 19b. An alignment film 14a for aligning liquid crystal molecules in the liquid crystal layer 19b is provided on the surface of the second thin sheet glass 14 facing the alignment film 13b.

An alignment film 14b for aligning liquid crystal molecules in the liquid crystal layer 19c is provided on the surface of the second thin sheet glass 14 neighboring the liquid crystal layer 19c. An alignment film 12a is provided on top of the counter electrode 17 of the second transparent substrate 12 to face the alignment film 14b. The liquid crystal layer 19c is disposed between the alignment film 14b and the alignment film 12a.

The present invention has a feature in that side surfaces 13c and 13d of the first thin sheet glass 13 and side surfaces 14c and 14d of the second thin sheet glass 14 have an outwardly bulging curved shape. Since the side surfaces 13c, 13d, 14c, and 14d have an outwardly bulging curved shape, this can reduce the likelihood of breakage of the first thin sheet glass 13 and second thin sheet glass 14 as will be described later. Therefore, thin sheet glasses having a small thickness can be used as the first thin sheet glass 13 and second thin sheet glass 14, so that the liquid crystal lens 10 can increase the lens power and the response speed.

As shown in FIG. 1, a power source 31 is provided between the peripheral electrode 16 and the counter electrode 17. Also, a power source 32 is provided between the circular electrode 15 and the counter electrode 17. The power source 32 can be connected to the circular electrode 15 by the connection to the lead-out portion 15b shown in FIG. 2. Lens functions of the liquid crystal lens 10 can be controlled by controlling the voltage V1 from the power source 31 to be applied to the peripheral electrode 16 and the voltage V2 from the power source 32 to be applied to the circular electrode 15. For example, when the voltage V2 is higher than the voltage V1, the liquid crystal lens 10 can be functioned as a convex lens. On the other hand, when the voltage V1 is higher than the voltage V2, the liquid crystal lens 10 can be functioned as a concave lens. Furthermore, by variably controlling the voltage V1 and the voltage V2, the lens functions, such as focal distance, can be controlled.

In the present invention, although no particular limitation is placed on the material of the first transparent substrate 11 and second transparent substrate 12 so long as it can transmit light to be treated by the liquid crystal lens 10, glass sheet or plastic sheet, for example, can be used. Among others, alkali-free glass is preferably used. Although no particular limitation is placed on the thickness, the thickness is preferably not more than 500 μm, more preferably within the range of 100 to 300 μm, and still more preferably within the range of 100 to 200 μm.

In the present invention, no particular limitation is placed on the shape of the first thin sheet glass 13 and second thin sheet glass 14 except that, as described above, the side surfaces 13c, 13d, 14c, and 14d have an outwardly bulging curved shape. Such a thin sheet glass can be obtained by cutting a glass ribbon whose side surfaces have the above curved shape, as will be described later. The thickness of such a glass ribbon is preferably not more than 100 μm, more preferably within the range of 5 to 100 μm, and still more preferably within the range of 5 to 50 μm. Therefore, it is preferred that the first thin sheet glass 13 and second thin sheet glass 14 also have the above thickness. Furthermore, the glass ribbon can be produced by stretching to be described later. The material of the glass ribbon may be any stretchable glass and usable materials include, for example, silicate glass, such as soda glass, borosilicate glass, aluminosilicate glass, and silica glass. Among others, alkali-free glass is preferably used.

The circular electrode 15, the peripheral electrode 16, and the counter electrode 17 are generally formed of transparent electrodes. An example of such a transparent electrode is an electrode made of an electrically conductive oxide, such as indium-tin oxide (ITO).

No particular limitation is placed on the type of the alignment films 11a, 13a, 13b, 14a, 14b, and 12a so long as it can align the liquid crystal layer. An example of such an alignment film is a polyimide film. The alignment film can be made by forming a polyimide film and rubbing the surface of the film. In this embodiment, the alignment films 11a, 13a, 13b, 14a, 14b, and 12a are made to have the same direction of alignment. The thickness of the alignment film is preferably within the range of 10 to 1000 nm and more preferably 10 to 100 nm.

No particular limitation is placed on the material of the sealing portions 18a, 18b, and 18c so long as it can form a cell for bonding a transparent substrate and a thin sheet glass together or thin sheet glasses together and retaining a liquid crystal layer. For example, the sealing portions can be made from a mixture of an acrylic, silicon or epoxy resin ultraviolet curable adhesive matched in refractive index with the glass and resin- or glass-made spacer balls or rods. These sealing portions also have a function as a spacer for holding the gap of a cell formed between a transparent substrate and a thin sheet glass or between thin sheet glasses. Alternatively, it is possible that the center portion of a transparent substrate and/or the center portion of a thin sheet glass are cut out in a circular shape, liquid crystals are held in the cutout portion, and the transparent substrate and the thin sheet glass are likewise bonded by an ultraviolet curable adhesive to allow the transparent substrate and/or the thin sheet glass to serve as a sealing partition wall and a spacer. The thickness of the cell held by such a sealing portion is preferably within the range of 10 to 100 μm and more preferably within the range of 10 to 50 μm.

A manufacturing method of the present invention is a manufacturing method in which a mother liquid crystal lens with a plurality of such liquid crystal lenses 10 as shown in FIG. 1 arrayed in the longitudinal direction thereof is produced and then cut in the direction substantially perpendicular to the longitudinal direction to separate out individual liquid crystal lens units.

Figure 3:
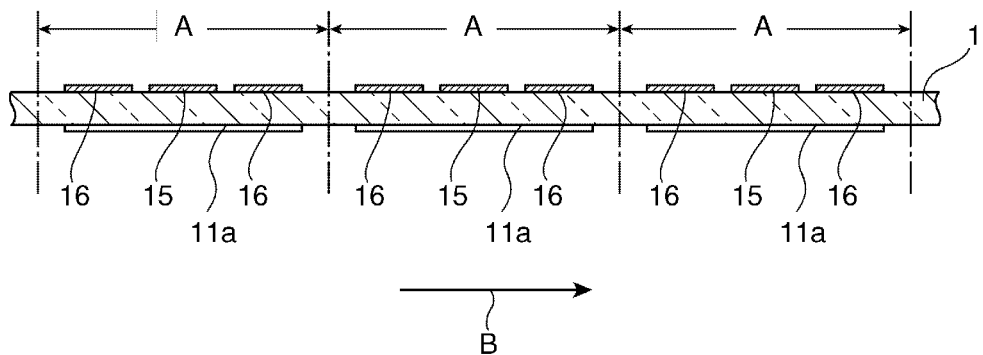
FIG. 3 is a cross-sectional view showing a first mother transparent substrate in the first embodiment according to the present invention.

FIG. 3 is a cross-sectional view showing a first mother transparent substrate 1 used in the above manufacturing method. The cross-sectional view shown in FIG. 3 is a cross-sectional view taken along the longitudinal direction B.

The first mother transparent substrate 1 provides the first transparent substrate 11 of the liquid crystal lens 10 shown in FIG. 1 by finally cutting the mother liquid crystal lens in the direction substantially perpendicular to the longitudinal direction B. As shown in FIG. 3, in each of regions A thereof corresponding to the respective liquid crystal lens units, a circular electrode 15 and a peripheral electrode 16 are formed on one side and an alignment film 11a is formed on the other side.

Figure 4:
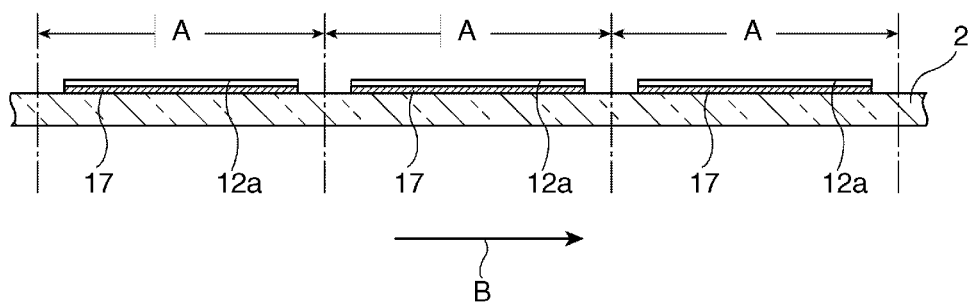
FIG. 4 is a cross-sectional view showing a second mother transparent substrate in the first embodiment according to the present invention.

FIG. 4 is a cross-sectional view showing a second mother transparent substrate 2 used in the above manufacturing method and a cross-sectional view taken along the longitudinal direction B. The second mother transparent substrate 2 provides the second transparent substrate 12 of the liquid crystal lens 10 shown in FIG. 1 by finally cutting the mother liquid crystal lens in the direction substantially perpendicular to the longitudinal direction B.

As shown in FIG. 4, in each of regions A thereof corresponding to the respective liquid crystal lens units, a counter electrode 17 and an alignment film 12a are formed.

Figure 5:
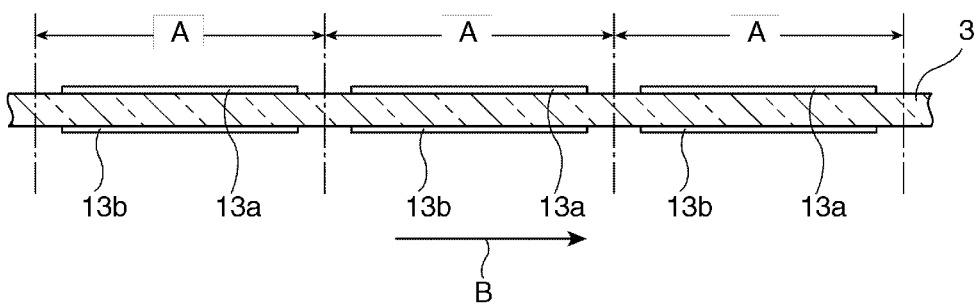
FIG. 5 is a cross-sectional view showing a glass ribbon in the first embodiment according to the present invention.

FIG. 5 is a cross-sectional view showing a glass ribbon 3 used in the above manufacturing method and a cross-sectional view taken along the longitudinal direction B. The glass ribbon 3 is a mother thin sheet glass providing the first thin sheet glass 13 or the second thin sheet glass 14 of the liquid crystal lens 10 shown in FIG. 1 by finally cutting the mother liquid crystal lens in the direction substantially perpendicular to the longitudinal direction B. FIG. 5 shows a glass ribbon 3 providing the first thin sheet glass 13.

As shown in FIG. 5, in each of regions A thereof corresponding to the respective liquid crystal lens units, an alignment film 13a is formed on one side and an alignment film 13b is formed on the other side.

The glass ribbon 3 shown in FIG. 5 and corresponding to the first thin sheet glass 13 and a glass ribbon 3 similar to that shown in FIG. 5 and corresponding to the second thin sheet glass 14 are placed between the first mother transparent substrate 1 shown in FIG. 3 and the second mother transparent substrate 2 shown in FIG. 4, each of sealing portions 18a, 18b, and 18c is formed on appropriate one of the first mother transparent substrate 1, the second mother transparent substrate 2, and the glass ribbons 3, and these transparent substrates and glass ribbons are then bonded together to form the sealing portions 18a, 18b, and 18c shown in FIG. 1 between them. Thereafter, each cell is filled with liquid crystals and then sealed to form liquid crystal layers 19a, 19b, and 19c, resulting in the production of a mother liquid crystal lens. Then, the mother liquid crystal lens is cut in the direction substantially perpendicular to the longitudinal direction, so that individual liquid crystal lens units can be separated out.

Figure 6:
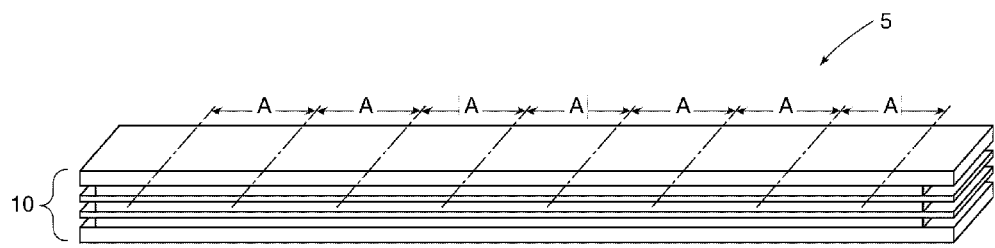
FIG. 6 is a perspective view showing a mother liquid crystal lens in the first embodiment according to the present invention.
Figure 6:
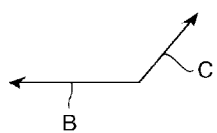

FIG. 6 is a perspective view showing the above mother liquid crystal lens 5. By producing the mother liquid crystal lens 5 and cutting it in the direction C substantially perpendicular to the longitudinal direction B as described above, the mother liquid crystal lens 5 can be cut into regions A corresponding to respective liquid crystal lens units to separate out the individual liquid crystal lens units.

Since in the present invention the side surfaces of the glass ribbon 3 extending along the longitudinal direction B have an outwardly bulging curved shape in a cross section perpendicular to the longitudinal direction B, this can reduce the likelihood of breakage of the glass ribbon 3 providing thin sheet glasses in the above production process. The glass ribbon 3 used in the present invention will be described below in further detail.

Figure 8:
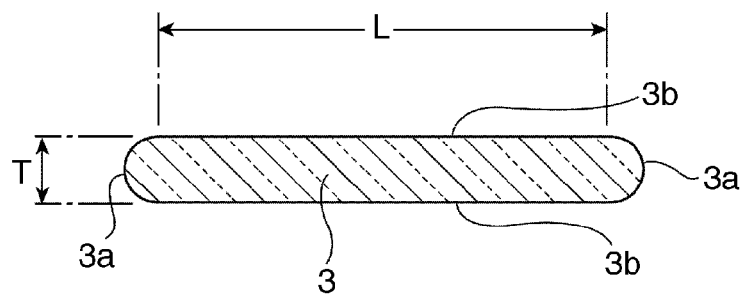
FIG. 8 is cross-sectional views showing glass ribbons used in embodiments according to the present invention.
Figure 8:
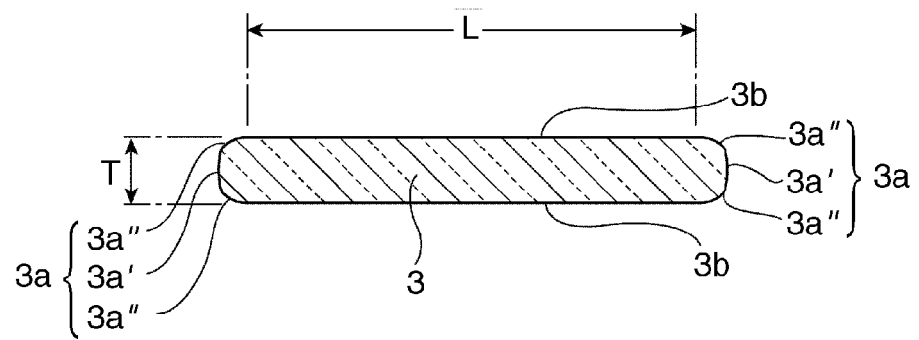
Figure 9:
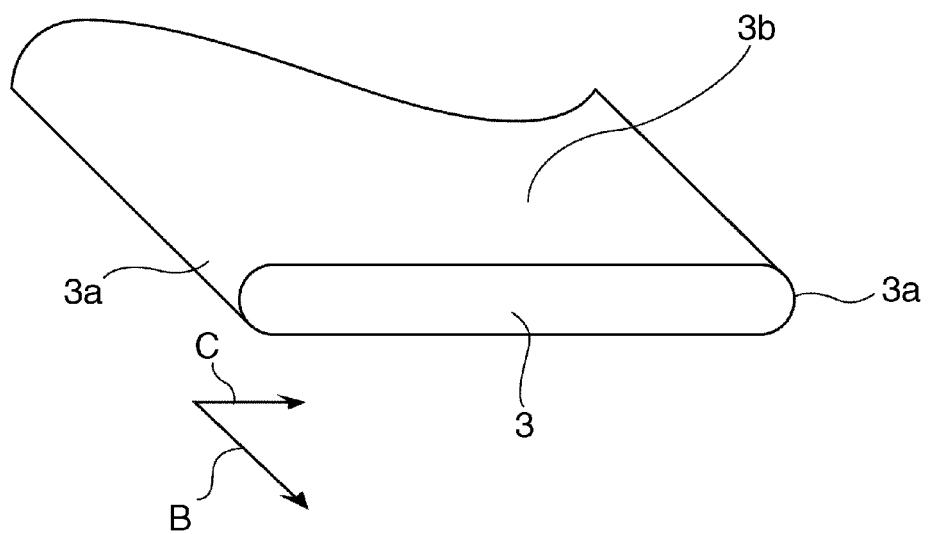
FIG. 9 is a perspective view showing the glass ribbon used in the embodiment according to the present invention.

FIG. 8(a) is a cross-sectional view showing the glass ribbon 3 and FIG. 9 is a perspective view of the glass ribbon 3. FIG. 8(a) shows a cross section taken along the direction C perpendicular to the longitudinal direction B shown in FIG. 9.

As shown in FIGS. 8(a) and 9, the side surfaces 3a of the glass ribbon 3 extending along the longitudinal direction B in the present invention have an outwardly bulging curved shape in a cross section taken along the direction C perpendicular to the longitudinal direction B. Examples of a cross-sectional shape having such a curved shape include an arcuate shape shown in FIGS. 8(a) and 9 and a shape shown in FIG. 8(b).

The side surface 3a shown in FIG. 8(b) is composed of an approximate planar portion 3a' and corner edge portions 3a'' each defined by the approximate planar portion 3a and a principal surface 3b. This corner edge portion 3a'' is formed in the shape of a rounded curve. Therefore, the side surface 3a shown in FIG. 8(b) also has a curved shape provided by the corner edge portions 3a''.

The curved shapes of the side surfaces 3a shown n FIGS. 8(a) and 8(b) are preferably shapes formed by softening of the glass. More specifically, when the glass softens, a surface tension acts on the glass surface. The curved shape is preferably a curved shape formed by the surface tension.

The thickness T of the glass ribbon 3 is preferably not more than 100 μm, more preferably not more than 50 μm, still more preferably not more than 25 μm, even more preferably not more than 20 μm, and most preferably not more than 10 μm. When the glass ribbon 3 has such a thickness, it can be given flexibility. In addition, the thickness T of the glass ribbon 3 is preferably not less than 0.5 μm, more preferably not less than 1 μm, and still more preferably not less than 5 μm. When the glass ribbon 3 has such a thickness, it can maintain its strength.

As described above, the alignment films 13a and 13b are formed on the respective principal surfaces 3b of the glass ribbon 3. The length L of the principal surface 3b is appropriately selected depending upon the size of liquid crystal lenses manufactured, but generally is preferably within the range of 2 to 10 mm and more preferably within the range of 5 to 10 mm.

Furthermore, the aspect ratio (L/T) of the length L of the principal surface 3b of the glass ribbon 3 to the thickness T thereof is preferably within the range of 25 to 2000.

The glass ribbon 3 preferably has flexibility and, for example, preferably has such a flexibility that it can be taken up around a bobbin.

Figure 10:
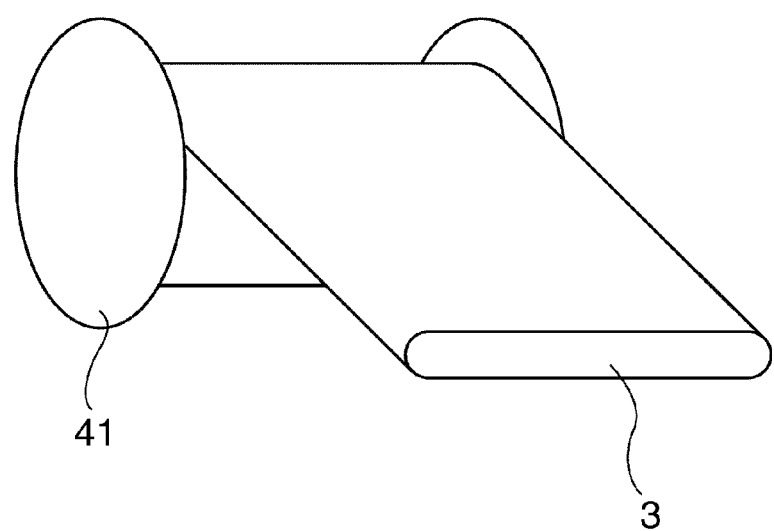
FIG. 10 is a perspective view showing a state of the glass ribbon used in the embodiment according to the present invention when the glass ribbon is taken up around a bobbin.

FIG. 10 is a perspective view showing a state of the glass ribbon 3 being taken around a bobbin 41.

Figure 11:
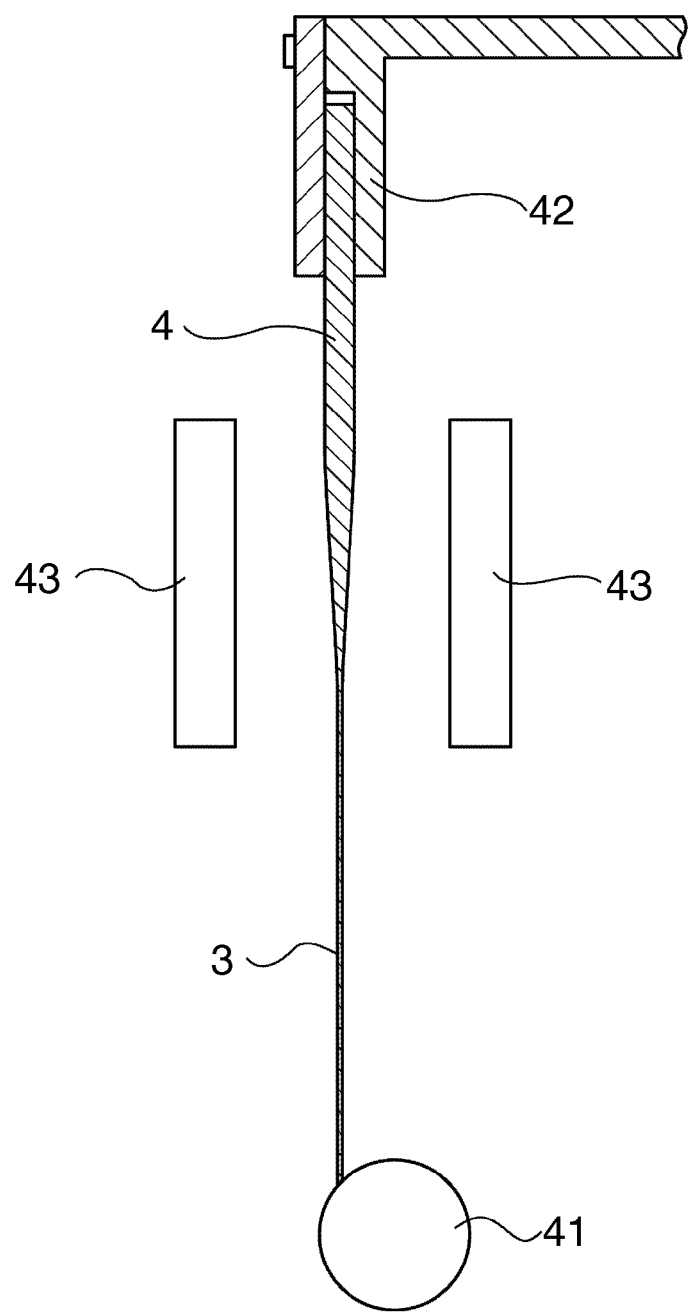
FIG. 11 is a schematic view for illustrating a method for producing the glass ribbon used in the embodiments according to the present invention.

The glass ribbon 3 used in the present invention can be produced, for example, by stretching. FIG. 11 is a schematic cross-sectional view for illustrating an apparatus for producing the glass ribbon 3 by stretching.

As shown in FIG. 11, a raw glass plate (original plate glass) 4 made of borosilicate glass is prepared. The thickness of the raw glass plate 4 is preferably not more than 10 mm, more preferably within the range of 5 to 0.1 mm, and still more preferably within the range of 3 to 0.1 mm. The raw glass plate 4 can be obtained by various forming processes, such as a roll forming process, a float forming process, an overflow downdraw forming process, an up-draw forming process or a slot down-draw forming process. The raw glass plate particularly preferably used is one obtained by the overflow downdraw forming process. With the use of this forming process, a row glass plate 4 can be obtained which has no scratch produced on the surface and has a high surface quality. By increasing the surface quality of the raw glass plate 4, the surface quality of the glass ribbon 3 obtained by a stretching process to be described below can also be increased, which makes it possible to take up the glass ribbon 3 with a greater curvature.

As shown in FIG. 11, one end of the raw glass plate 4 is set in a stretching apparatus 42, a heater 43 is disposed around the other end of the raw glass plate 4, and the other end of the raw glass plate 4 is stretched with application of heat thereto. By the stretching, the thickness of the raw glass plate 4 can be reduced to form a glass ribbon 3. Using the heater 43, the other end portion of the raw glass plate 4 is heated to a temperature higher than the softening point of the glass. Generally, the other end portion is heated to a temperature about 50° C. to 200° C. higher than the softening point.

The glass ribbon 3 obtained by stretching the other end of the raw glass plate 4 can have a small thickness as shown in FIG. 11. As described previously, generally, the glass ribbon is formed to have a thickness of not more than 100 μm.

Figure 12:
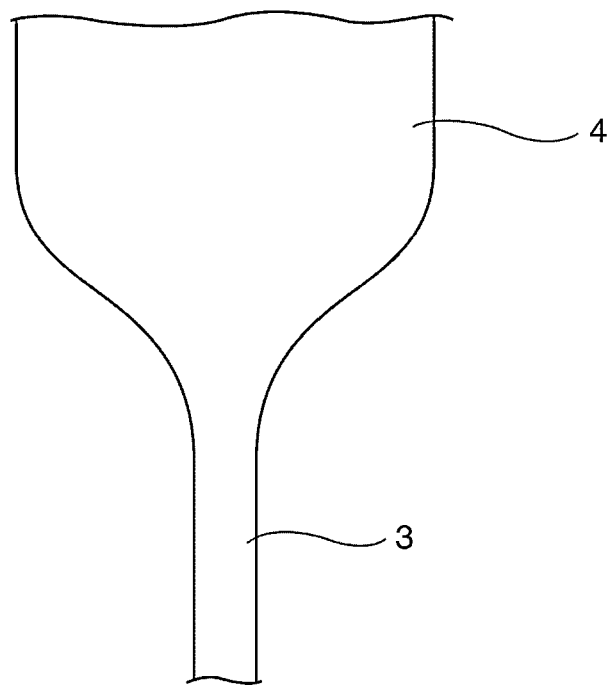
FIG. 12 is a plan view for illustrating a production process of the glass ribbon used in the embodiments according to the present invention.

FIG. 12 is a plan view showing a state in which a glass ribbon 3 is formed by stretching the other end of the raw glass plate 4. As shown in FIG. 12, by stretching, the glass plate can be reduced in thickness and also reduced in width, i.e., the length of the principal surface. As described previously, the aspect ratio (principal surface length to thickness) of the glass ribbon 3 is preferably within the range of 25 to 2000.

The stretching is preferably performed at a temperature which gives the other end of the raw glass plate 4 a viscosity of 6.0 to 9.0 dPa·s. Thus, a glass ribbon 3 can be obtained which is free of warpage and bend in the width direction (the direction C perpendicular to the longitudinal direction B) and has a uniform thickness.

If stretching is performed at a temperature which gives the glass a viscosity of below 6.0 dPa·s (at a higher temperature), this is unfavorable because the aspect ratio of the resultant glass ribbon 3 may significantly change. On the other hand, a temperature giving the glass a viscosity of above 9.0 dPa·s (at a lower temperature) is unfavorable because the excessive viscosity makes it difficult to perform stretching. Stretching is more preferably performed at a temperature which gives the glass a viscosity of 6.0 to 7.5 dPa·s. Particularly in the case that the thickness of the raw glass plate 4 is not more than 0.5 mm and the thickness of a glass ribbon 3 after stretching is not more than 25 μm, it is preferred to perform stretching to give the glass a viscosity of 6.0 to 7.0 dPa·s because the shape of the side surfaces 3a of the glass ribbon 3 will approach a more arcuate shape.

Alternatively, if a small change between the aspect ratio of the raw glass plate 4 and the aspect ratio of the glass ribbon 3 is desired, stretching is preferably performed at a temperature which gives the glass a viscosity of 7.5 to 9.0 dPa·s. Particularly, stretching at a temperature giving the glass a viscosity of 8.0 to 9.0 dPa·s can further reduce the above change between the aspect ratios.

The glass ribbon 3 obtained after stretching can be taken around the bobbin 41 as shown in FIG. 11. The glass ribbon may be taken up by a take-up drum instead of the bobbin 41. By taking up the glass ribbon 3 after stretching in this manner, the glass ribbon 3 can be given a tensile force during the stretching. In addition, by controlling the take-up rate, the tensile force and, hence, the stretching rate can be controlled.

As described so far, by producing a glass ribbon using the production method described above, a glass ribbon 3 can be obtained in which the side surfaces 3a have an outwardly bulging curved shape.

In the present invention, since a liquid crystal lens is manufactured using a glass ribbon 3 whose side surfaces 3a have an outwardly bulging curved shape, this can reduce, even with the use of a glass ribbon having a small thickness, the likelihood of breakage of the glass ribbon, i.e., thin sheet glasses, in the production process. Therefore, a liquid crystal lens can be manufactured using a glass ribbon having a small thickness, i.e., a thin sheet glass, which enables manufacturing of a liquid crystal lens having an increased lens power and concurrently having a high response speed.

In addition, since the likelihood of breakage of the glass ribbon, i.e., thin sheet glasses, in the production process can be reduced, the yield can be increased to increase the production efficiency.

Figure 13:
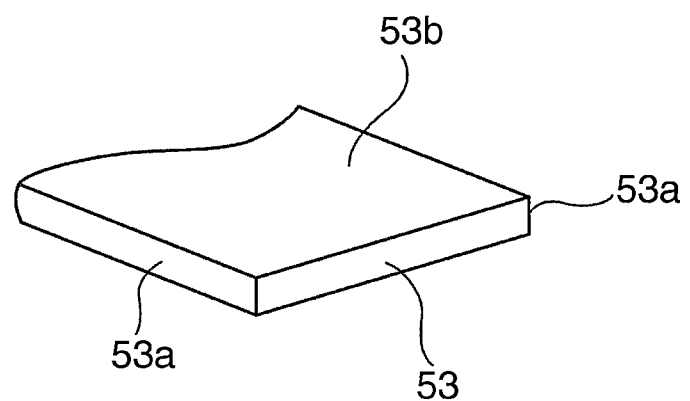
FIG. 13 is a perspective view showing a conventional glass ribbon.

FIG. 13 is a perspective view showing a conventional glass ribbon. As shown in FIG. 13, a conventional glass ribbon 53 is rectangular in a cross section perpendicular to the longitudinal direction and its side surfaces 53a are formed flatly. Therefore, the edges formed by the principal surfaces 53b and the side surfaces 53a are sharp edges, so that the glass ribbon 53 will be easily broken when given a stress, such as bending or torsion, in the production process.

In contrast, with the use of the glass ribbon 3 of the present invention whose side surfaces 3a have an outwardly bulging curved shape, a liquid crystal lens can be manufactured without breakage of the glass ribbon 3 even when a stress, such as bending or torsion, is applied to the glass ribbon 3 in the production process of the liquid crystal lens.

Figure 7:
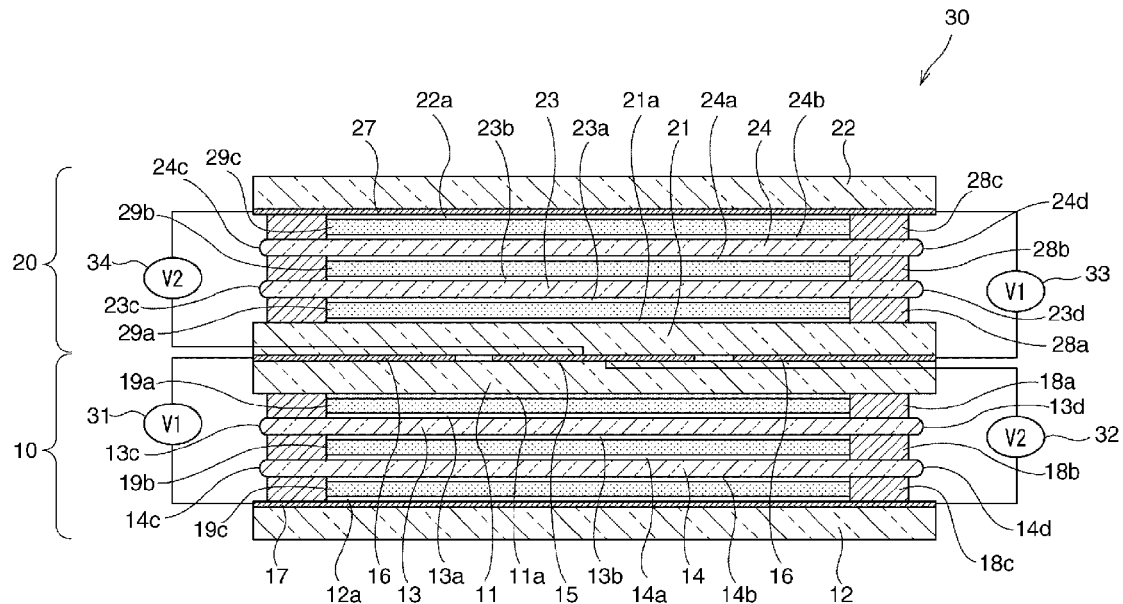
FIG. 7 is a cross-sectional view showing a liquid crystal lens of a second embodiment according to the present invention.

FIG. 7 is a cross-sectional view showing a liquid crystal lens of a second embodiment according to the present invention. In the liquid crystal lens 30 shown in FIG. 7, a liquid crystal lens 10 shown in FIG. 1 is used as a P-polarizing liquid crystal lens 10. Furthermore, a liquid crystal lens having substantially the same structure as the liquid crystal lens 10 shown in FIG. 1 is disposed as an S-polarizing liquid crystal lens 20 in a position rotated 90 degrees with respect to the P-polarizing liquid crystal lens 10 to make their alignment (rubbing) directions orthogonal to each other and overlaid on the P-polarizing liquid crystal lens 10. A circular electrode 15 and a peripheral electrode 16 in the S-polarizing liquid crystal lens 20 are common to the P-polarizing liquid crystal lens 10 and, therefore, a liquid crystal lens with neither circular electrode 15 nor peripheral electrode 16 formed thereon is laid as the S-polarizing liquid crystal lens 20.

The P-polarizing liquid crystal lens 10 and the S-polarizing liquid crystal lens 20 are bonded together by an ultraviolet curable resin adhesive matched in refractive index with the glass.

A third transparent substrate 21 is provided in contact with the circular electrode 15 and the peripheral electrode 16. A third thin sheet glass 23 and a fourth thin sheet glass 24 are disposed between the third transparent substrate 21 and a fourth transparent substrate 22. A liquid crystal layer 29a is formed between the third transparent substrate 21 and the third thin sheet glass 23. A liquid crystal layer 29b is formed between the third thin sheet glass 23 and the fourth thin sheet glass 24. A liquid crystal layer 29c is formed between the fourth thin sheet glass 24 and the fourth transparent substrate 22.

An alignment film 21a is formed on the surface of the third transparent substrate 21 neighboring the liquid crystal layer 29a. An alignment film 23a is formed on the surface of the third thin sheet glass 23 neighboring the liquid crystal layer 29a. An alignment film 23b is formed on the surface of the third thin sheet glass 23 neighboring the liquid crystal layer 29b. An alignment film 24a is formed on the surface of the fourth thin sheet glass 24 neighboring the liquid crystal layer 29b. An alignment film 24b is formed on the surface of the fourth thin sheet glass 24 neighboring the liquid crystal layer 29c. A counter electrode 27 is formed on the surface of the fourth transparent substrate 22 neighboring the liquid crystal layer 29c and an alignment film 22a is formed on the counter electrode 27. A power source 33 is provided between the peripheral electrode 16 and the counter electrode 27, while a power source 34 is provided between the circular electrode 15 and the counter electrode 27.

The alignment films 21a, 23a, 23b, 24a, 24b, and 22a are formed to align in the same direction. The direction of alignment of the alignment films 21a, 23a, 23b, 24a, 24b, and 22a in the S-polarizing liquid crystal lens 20 is set to be orthogonal to that of the alignment films 11a, 13a, 13b, 14a, 14b, and 12a in the P-polarizing liquid crystal lens 10. Thus, while the P-polarizing liquid crystal lens 10 collects P-polarized light and transmits S-polarized light by its lens effect, the S-polarizing liquid crystal lens 20 can transmit P-polarized light and collect S-polarized light by its lens effect. Therefore, by combining the P-polarizing liquid crystal lens 10 with the S-polarizing liquid crystal lens 20, all of light passing through the liquid crystal lens 30 can be collected by the lens effect. Hence, the lens effect can be exerted on natural light without using any polarizing plate and a high light transmittance can be achieved.

Also in the S-polarizing liquid crystal lens 20, like the P-polarizing liquid crystal lens 10, a sealing portion 28a is provided between the third transparent substrate 21 and the third thin sheet glass 23, a sealing portion 28b is provided between the third thin sheet glass 23 and the fourth thin sheet glass 24, and a sealing portion 28c is provided between the fourth thin sheet glass 24 and the fourth transparent substrate 22.

Furthermore, as shown in FIG. 7, the side surfaces 23c and 23d of the third thin sheet glass 23 and the side surfaces 24c and 24d of the fourth thin sheet glass 24 have an outwardly bulging curved cross-sectional shape.

Also for the S-polarizing liquid crystal lens 20, in the same manner as in the liquid crystal lens 10 shown in FIG. 1 and as described with reference to FIGS. 3 to 5, a mother liquid crystal lens can be produced, using a third mother transparent substrate corresponding to the third transparent substrate 21, a fourth mother transparent substrate corresponding to the fourth transparent substrate 22, and glass ribbons corresponding to the third and fourth thin sheet glasses, by forming alignment films and a counter electrode 27 on them, then bonding them together by the sealing portions 28a, 28b, and 28c, filling cells thus formed with liquid crystals to form liquid crystal layers 29a, 29b, and 29c, and then sealing the liquid crystal layers 29a, 29b, and 29c. The resultant mother liquid crystal lens is cut in the direction substantially perpendicular to the longitudinal direction in the same manner as in the liquid crystal lens 10 shown in FIG. 6, so that the S-polarizing liquid crystal lens 20 can be produced.

The P-polarizing liquid crystal lens 10 and the S-polarizing liquid crystal lens 20 are bonded together by an adhesive, such as an ultraviolet curable resin adhesive, as described above, so that the liquid crystal lens 30 shown in FIG. 7 can be produced.

As described previously, the direction of alignment of the alignment films in the P-polarizing liquid crystal lens 10 is orthogonal to that of the alignment films in the S-polarizing liquid crystal lens 20. Therefore, in producing a mother for the P-polarizing liquid crystal lens 10 and a mother for the S-polarizing liquid crystal lens 20, their alignment films may be formed in advance so that the alignment films for the P-polarizing liquid crystal lens are orthogonal in direction of alignment to the alignment films for the S-polarizing liquid crystal lens 20. Alternatively, a liquid crystal lens 30 may be produced by first forming the mother for the P-polarizing liquid crystal lens 10 and the mother for the S-polarizing liquid crystal lens 20 to have the same direction of alignment of the alignment films and then bonding the P-polarizing liquid crystal lens 10 and S-polarizing liquid crystal lens 20 cut off from the mothers by an adhesive so that the alignment films in the P-polarizing liquid crystal lens 10 are orthogonal in direction of alignment to the alignment films in the S-polarizing liquid crystal lens 20.

In the manufacturing method of the present invention, even with the use of a thin sheet glass having a small thickness as a glass sheet for dividing a liquid crystal layer, the likelihood of breakage of the thin sheet glass in the production process can be reduced. Therefore, a glass having a small thickness can be used as a thin sheet glass for dividing the liquid crystal layer. Since each of the liquid crystal layers divided by the thin sheet glass has a small thickness and its liquid crystals are aligned by the alignment film, the response speed to the voltage applied thereto can be increased. In addition, since the liquid crystal layer as a whole can be increased in thickness, a high lens power can be achieved. Therefore, a liquid crystal lens can be manufactured which maintains a high lens power and concurrently has a high response speed.

Furthermore, since the likelihood of breakage of the thin sheet glass in the production process can be reduced, the yield can be increased to increase the production efficiency.

In the liquid crystal lens of the present invention, the liquid crystal layer is divided into a plurality of cells by a thin sheet glass disposed substantially in parallel with the transparent substrates and the thin sheet glass is a glass sheet obtained by cutting a glass ribbon in a direction substantially perpendicular to a longitudinal direction thereof. In cutting the mother liquid crystal lens in the direction substantially perpendicular to the longitudinal direction to separate out liquid crystal lens units, side surfaces of each liquid crystal lens unit other than the cut surfaces have an outwardly bulging curved shape. As described above, since a glass ribbon whose side surfaces have an outwardly bulging curved cross-sectional shape is used, this can reduce, even with the use of a glass ribbon having a small thickness, the likelihood of breakage of the glass ribbon in the production process. Therefore, the thickness of the thin sheet glass can be decreased, resulting in a liquid crystal lens maintaining a high lens power and concurrently having a high response speed.

Although illustrated in the above embodiments are liquid crystal lenses with both of a circular electrode and a peripheral electrode formed therein, the liquid crystal lens of the present invention is not limited to the above type and may be one with only a circular electrode formed therein or one with only a peripheral electrode formed therein.

REFERENCE SIGNS LIST

1 . . . first mother transparent substrate
2 . . . second mother transparent substrate
3 . . . glass ribbon
3a . . . side surface of glass ribbon
3b . . . principal surface of glass ribbon
4 . . . raw glass plate
5 . . . mother liquid crystal lens
10 . . . liquid crystal lens (P-polarizing liquid crystal lens)
11 . . . first transparent substrate
11a, 12a, 13a, 13b, 14a, 14b . . . alignment film
12 . . . second transparent substrate
13 . . . first thin sheet glass
13c, 13d, 13c, 14d . . . side surface
14 . . . second thin sheet glass
15 . . . circular electrode
15a . . . circular portion
15b . . . lead-out portion
15c . . . clearance
16 . . . peripheral electrode
17 . . . counter electrode
18a, 18b, 18c . . . sealing portion
19a, 19b, 19c . . . liquid crystal layer
20 . . . S-polarizing liquid crystal lens
21 . . . third transparent substrate
22 . . . fourth transparent substrate
23 . . . third thin sheet glass 24 . . . fourth thin sheet glass
27 . . . counter electrode
21a, 22a, 23a, 23b, 24a, 24b . . . alignment film
23c, 23d, 24c, 24d . . . side surface
28a, 28b, 28c . . . sealing portion
29a, 29b, 29c . . . liquid crystal layer
30 . . . liquid crystal lens
31, 32, 33, 34 . . . power source
41 . . . bobbin
42 . . . stretching apparatus
43 . . . heater
A . . . region corresponding to liquid crystal lens unit
B . . . longitudinal direction
C . . . direction perpendicular (substantially perpendicular) to longitudinal direction

The invention claimed is:

1. A method for manufacturing a liquid crystal lens capable of changing a state of alignment of liquid crystal molecules in a liquid crystal layer sandwiched between a pair of transparent substrates by application of an electric field to the liquid crystal layer, the liquid crystal layer being divided into a plurality of cells by a thin sheet glass disposed substantially in parallel with the transparent substrates, in which a mother liquid crystal lens having a plurality of liquid crystal lens units arrayed in a longitudinal direction thereof is cut for each of the liquid crystal lens units to separate out the liquid crystal lens units and thus manufacture respective liquid crystal lenses, the method comprising the steps of:

preparing a pair of mother transparent substrates which provide the transparent substrates of the liquid crystal lens after being cut;

forming electrode layers for application of the electric field on regions of the mother transparent substrates corresponding to the liquid crystal lens units and forming alignment films for aligning the liquid crystal molecules on regions of the mother transparent substrates neighboring the liquid crystal layer;

preparing a glass ribbon which provides the thin sheet glasses of the liquid crystal lenses after being cut and has a pair of opposed principal surfaces and a pair of opposed side surfaces all of which extend along the longitudinal direction;

forming alignment films for aligning the liquid crystal molecules on regions of the principal surfaces of the glass ribbon neighboring the liquid crystal layer;

forming sealing portions for formation of walls of the cells of the liquid crystal layer around regions of the mother transparent substrates corresponding the liquid crystal layer and/or around regions of the principal surfaces of the glass ribbon corresponding to the liquid crystal layer;

producing the mother liquid crystal lens by bonding the pair of mother transparent substrates and the pair of principal surfaces of the glass ribbon together to bring a state in which the glass ribbon is disposed between the pair of mother transparent substrates, then filling the cells of the liquid crystal layer with liquid crystals, and then sealing the cells of the liquid crystal layer; and cutting the mother liquid crystal lens for each of the liquid crystal lens units to separate out the liquid crystal lens units and thus manufacture the respective liquid crystal lenses, wherein the side surfaces of the glass ribbon extending along the longitudinal direction have an outwardly bulging curved shape in a cross section perpendicular to the longitudinal direction, and wherein the plurality of liquid crystal lens units are arrayed in only the longitudinal direction of the mother liquid crystal lens, and wherein an aspect ratio of a length of the principal surfaces of the glass ribbon taken perpendicularly to the longitudinal direction thereof to a thickness of the glass ribbon (principal surface length to thickness) is 25 to 2000.

2. The method for manufacturing a liquid crystal lens according to claim 1, wherein the thickness of the glass ribbon is 25 µm or less.

3. The method for manufacturing a liquid crystal lens according to claim 2, wherein the shape of the cross section of the side surfaces is a shape formed by softening of glass.

4. The method for manufacturing a liquid crystal lens according to claim 3, wherein the glass ribbon is made of crystallized glass.

5. The method for manufacturing a liquid crystal lens according to claim 2, wherein the glass ribbon is made of crystallized glass.

6. The method for manufacturing a liquid crystal lens according to claim 1, wherein the shape of the cross section of the side surfaces is a shape formed by softening of glass.

7. The method for manufacturing a liquid crystal lens according to claim 6, wherein the glass ribbon is made of crystallized glass.

8. The method for manufacturing a liquid crystal lens according to claim 1, wherein the glass ribbon is made of crystallized glass.

* * * * *